United States Patent
Ghodasara et al.

(10) Patent No.: US 12,551,844 B2
(45) Date of Patent: Feb. 17, 2026

(54) HYDROGEN SEPARATION FROM NATURAL GAS

(71) Applicant: Air Products and Chemicals, Inc., Allentown, PA (US)

(72) Inventors: Kamlesh Ghodasara, Borehamwood (GB); Maulik R. Shelat, Macungie, PA (US); Edward Landis Weist, Jr., Macungie, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 238 days.

(21) Appl. No.: 18/499,382

(22) Filed: Nov. 1, 2023

(65) Prior Publication Data

US 2024/0149213 A1 May 9, 2024

Related U.S. Application Data

(60) Provisional application No. 63/423,875, filed on Nov. 9, 2022.

(51) Int. Cl.
*B01D 53/22* (2006.01)
*B01D 53/047* (2006.01)
(Continued)

(52) U.S. Cl.
CPC ......... *B01D 53/229* (2013.01); *B01D 53/047* (2013.01); *B01D 53/227* (2013.01);
(Continued)

(58) Field of Classification Search
None
See application file for complete search history.

(56) References Cited

U.S. PATENT DOCUMENTS

| 4,701,187 A | 10/1987 | Choe et al. |
| 5,064,446 A * | 11/1991 | Kusuki .................. C01B 3/501 |
| | | 95/55 |

(Continued)

FOREIGN PATENT DOCUMENTS

| CN | 102701151 B | 4/2014 |
| CN | 111232924 A | 6/2020 |

(Continued)

OTHER PUBLICATIONS

Lei Linfeng et al: "Carbon molecular sieve membranes for hydrogen purification from a steam methane reforming process", Journal of Membrane Science, Elsevier BV, NL vol. 627, Mar. 5, 2021.

(Continued)

*Primary Examiner* — Tam M Nguyen
(74) *Attorney, Agent, or Firm* — Matthew Richard Weaver

(57) ABSTRACT

Methods and systems for measuring the concentration of a light gas in a main flow stream are disclosed herein. The methods include calculating a control parameter as a function of the concentration of the light gas in the main flow stream; dividing a portion of the main flow stream to produce a feed stream; and separating the feed stream by selective permeation across a semi-permeable membrane to produce a permeate stream enriched in the light gas and a retentate depleted in the light gas. A ratio of the flow rate of the feed stream to the flow rate of the main flow stream may be increased or decreased according to the control parameter. In addition, an area of the semi-permeable membrane may be increased or decreased according to the control parameter.

16 Claims, 5 Drawing Sheets

(51) Int. Cl.
    *B01D 53/30*     (2006.01)
    *C07C 7/144*     (2006.01)
    *C07C 7/148*     (2006.01)
    *C10L 3/10*     (2006.01)

(52) U.S. Cl.
    CPC .............. *B01D 53/30* (2013.01); *C07C 7/144* (2013.01); *C10L 3/101* (2013.01); *B01D 2053/221* (2013.01); *B01D 2257/108* (2013.01); *B01D 2257/7025* (2013.01)

(56) References Cited

U.S. PATENT DOCUMENTS

| | | | | |
|---|---|---|---|---|
| 5,611,841 | A * | 3/1997 | Baker | B01D 63/1031 96/4 |
| 5,779,763 | A * | 7/1998 | Pinnau | B01D 53/229 95/55 |
| 9,770,687 | B2 * | 9/2017 | Ungerank | B01D 53/226 |
| 12,139,681 | B1 * | 11/2024 | Bikson | C10L 3/106 |
| 12,454,654 | B1 * | 10/2025 | Bikson | C10L 3/104 |
| 2005/0123813 | A1 * | 6/2005 | Matoba | H01M 8/04007 429/442 |
| 2007/0272079 | A1 * | 11/2007 | Malsam | B01D 71/44 96/7 |
| 2010/0313750 | A1 * | 12/2010 | Sanders, Jr. | B01D 63/00 95/1 |
| 2022/0134274 | A1 | 5/2022 | Pedersen et al. | |
| 2022/0143549 | A1 | 5/2022 | Bauer et al. | |
| 2025/0333660 | A1 * | 10/2025 | Bikson | C10L 3/104 |

FOREIGN PATENT DOCUMENTS

| | | |
|---|---|---|
| FR | 2758475 B1 | 2/1999 |
| FR | 2904821 B1 | 2/2009 |
| JP | 5830989 B2 | 12/2015 |
| WO | 2020079403 A1 | 4/2020 |

OTHER PUBLICATIONS

ISRWO, PCT/US2023/036579; Mar. 4, 2024.

* cited by examiner

HYDROGEN SEPARATION FROM NATURAL GAS

CROSS-REFERENCE TO RELATED APPLICATIONS

The present application claims priority to U.S. Provisional Patent Application No. 63/423,875, filed on Nov. 9, 2022.

BACKGROUND

As the hydrogen economy continues to expand, blending hydrogen ($H_2$) into existing natural gas transport networks has been proposed to decarbonize end users as an interim solution while dedicated $H_2$ transport networks are being developed. In some instances, where $H_2$ depleted natural gas is required by the end users (such as petrochemical/polymer industries and natural gas liquefaction plants), technology solutions to remove $H_2$ from the natural gas blend will be required. Additionally, natural gas transport networks could also be used to transport hydrogen over long distances and can be extracted as high purity hydrogen to be used for clean combustion and/or fuel cell applications. Since most of the hydrogen is expected to be produced using renewable energy sources which are expected to provide varying amounts of energy to the hydrogen production units (e.g., using electrolyzers) over a period of time, hydrogen production is expected to vary over a period of time as well. When this varying hydrogen is blended in natural gas, it may result in significant variation in the hydrogen concentration of the blended natural gas stream. There is a need for a separation process to "deblend" the hydrogen from natural gas that may compensate for a feed with varying hydrogen concentration for applications that may accept a hydrogen product with a varying flow rate, such as when storage is available.

SUMMARY

This disclosure is related to methods and systems for separating hydrogen from a natural gas feed comprising a varying hydrogen concentration using technologies such as selectively permeable membranes and adsorption. An adaptive design and dynamic operation may adjust to variation in hydrogen concentration to achieve maximum hydrogen separation during daytime hours when more hydrogen may be produced and blended into the natural gas feed.

In some embodiments disclosed herein, a separation process may comprise a first membrane stage, an interstage compressor, a second membrane stage, and a polishing stage. In some embodiments the polishing stage may comprise a pressure swing adsorption (PSA) unit.

Depending on hydrogen concentration in the natural gas, a total feed flow rate to the first membrane stage may be controlled based on the number of installed membrane modules, the interstage compressor capacity, and/or the number of rotary valve PSA units (or PSA capacity).

In addition to controlling the feed flow to the membranes, the total number of membrane modules may be controlled by closing or opening on-off valves upstream of the membrane modules or groups of membrane modules in the first membrane stage. Controlling the total number of membrane modules or the total membrane area used to separate hydrogen from natural gas may reduce the amount of methane that permeates into a hydrogen-enriched permeate stream.

Controlled membrane modules in the first membrane stage may maximize hydrogen content in the permeate stream which may be compressed with tail gas from the PSA unit in the permeate compressor. The permeate compressor may be designed to operate under a wide range of inlet flow rate and composition values.

The total number of modules on-line in the second membrane stage may be controlled by closing or opening on-off valves upstream of membrane modules or groups of modules in the second membrane stage in response to changes in the flow rate and hydrogen content or the stream leaving the interstage compressor. Controlling the total number of membrane modules on-line in the second membrane stage may maximize the concentration of hydrogen in a second permeate stream leaving the second membrane stage.

The second permeate stream may then be purified in a PSA unit. The PSA unit may comprise one or more rotary valve PSA units for small flow rates or one or more switch valve PSA units for large flow rates. Depending on the PSA unit's feed and impurities within it, the PSA unit capacity may be controlled. In the case of rotary valve PSAs, the number of rotary valve PSAs in operation may be controlled. Depending on the flow rate and concentration of impurities in the second permeate stream and the adsorption capacity in operation, the cycle time may be optimized to maximize recovery of hydrogen.

BRIEF DESCRIPTION OF THE DRAWINGS

The present invention will hereinafter be described in conjunction with the appended figures wherein like numerals denote like elements.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

Figure 1:
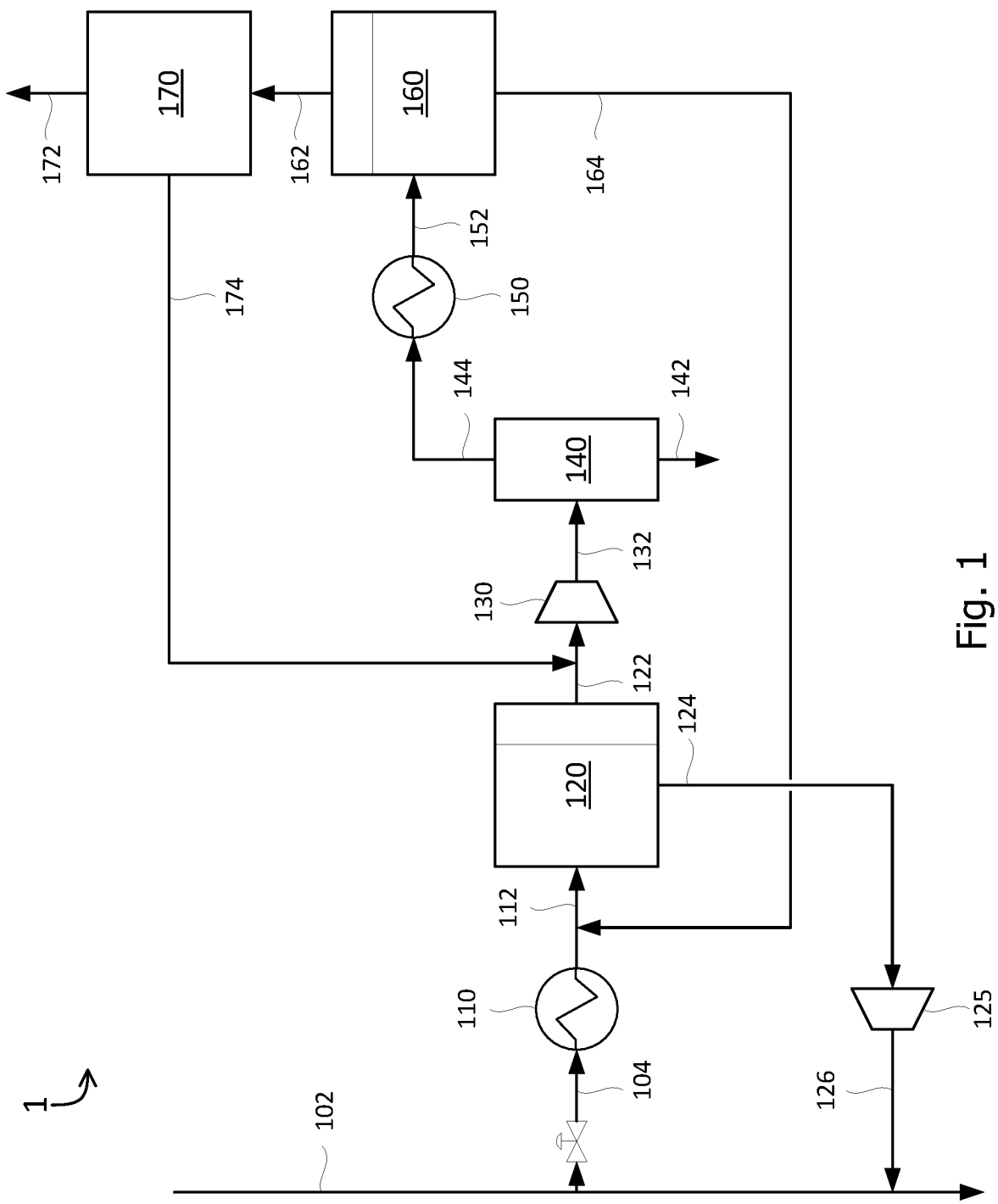
FIG. 1 is a process flow diagram depicting a process for extracting hydrogen from a natural gas stream.

FIG. 1 is a process flow diagram depicting a process for extracting hydrogen from a natural gas stream comprising hydrogen. A portion of main flow stream 102 may be divided to form a feed stream 104. In some embodiments main flow stream 102 may be a natural gas pipeline. Feed stream 104 may be heated as necessary to form first stage membrane feed stream 112 in a first feed preheater 110 to prevent condensation in the first membrane stage 120. First membrane stage 120 may comprise one or more membrane modules which in turn comprise a membrane material that selectively permeates light gases such as hydrogen over methane. Hydrogen-enriched first permeate stream 122 leaves first membrane stage 120 and may be compressed in an interstage compressor 130 to form compressed permeate stream 132. Hydrogen-depleted first retentate stream 124 leaves first membrane stage 120 and may be compressed in blower 125 to form compressed retentate stream 126 and returned to main flow stream 102. In some embodiments the compressed retentate stream 126 may be returned to the main flow stream 102 downstream from where the feed stream 104 is divided. If required, a separator 140 may be used to remove liquid condensate 142 such as water. The overhead 144 from the separator 140 may be heated as necessary in a second feed preheater 150 to produce a second stage membrane feed 152, which will prevent condensation in second membrane stage 160. Second membrane stage 160 may comprise one or more membrane modules which in turn comprise a membrane material that selectively permeates hydrogen over methane. Second membrane stage 160 may use the same or a different membrane material as first membrane stage 120. Hydrogen-enriched second permeate stream 162 may then be purified in a polishing stage 170 such as a pressure swing adsorption (PSA) system. Hydrogen-depleted second retentate stream 164 may be recycled to first stage membrane 112. Hydrogen product stream 172 leaves the polishing stage 170 with the required purity for downstream customers. Hydrogen-depleted tail gas stream 174 leaves polishing stage 170 and may be compressed in interstage compressor 130 to improve overall hydrogen recovery. Hydrogen-depleted tail gas stream 174 may be combined with the first permeate stream 122 prior to compression. If the two streams are at different pressures, the hydrogen-depleted tail gas stream 174 and the first permeate stream 122 may enter different stages of the interstage compressor 130.

An adaptive design with dynamic control may compensate for the variation of hydrogen content in main flow stream 102 and extract required hydrogen at the lowest overall cost. Extracted $H_2$ flow may vary as the $H_2$ concentration in main flow stream 102 varies. The hydrogen concentration in the main flow stream 102 may vary over the course of a 24 hour period. The hydrogen product stream 172 may be stored as a compressed gas or liquid to ensure constant product supply to users.

A controller may be configured to increase or decrease the feed flow rate to first membrane stage 120 in order to control the permeate flow rate 122. Any number of process variables may be monitored to control the feed flow rate, such as the hydrogen content of the natural gas feed. The flow rate of feed stream 104 may be controlled according to a control parameter calculated as a function of the concentration of hydrogen in main flow stream 102 and the various design parameters of the first and second membrane stages 120 and 160. The control parameter may be calculated to provide a constant hydrogen product flow rate when averaged over a time scale ranging from 1 hour to 7 days, or from 12 hours to 48 hours.

A controller may be configured to isolate a number of membrane modules in the first membrane stage 120 to isolate from the first stage membrane feed 112 by switching one or more isolation valves. In some embodiments, the first stage membrane may be partially turned down, such as by decreasing the pressure gradient across the membrane. Any number of process variables may be monitored to control the number of membrane modules in the first membrane stage 120, such as the hydrogen content of the feed stream 104 and the feed flow rate to the first membrane stage 120. Reducing the number of membrane modules on-stream in the first membrane stage 120 may reduce the flow rate of the first permeate stream 122 and/or may increase the hydrogen concentration in the first permeate stream 122. This in turn may reduce the total power needed to compress the first permeate stream 122 in the interstage compressor 130.

Similarly, a controller may be configured to isolate a number of membrane modules in the second membrane stage 160 to isolate from the second stage membrane feed 152 by switching one or more isolation valves. Any number of process variables may be monitored to control the number of membrane modules in the second membrane stage, such as the hydrogen content and/or total flow rate of the second stage membrane feed 152. Reducing the number of membrane modules on-stream in the second membrane stage 160 may reduce the flow rate of the second permeate stream 162 and/or may increase the hydrogen concentration in the second permeate stream 162. This in turn may improve the performance of the polishing stage 170. Using the value of the flow rate and $H_2$ content of the feed to the second membrane stage 160, the controller will estimate number of membrane modules (or module groups) required in the second membrane stage 160 to treat the first permeate 122 and tail gas 174 from the polishing stage 170 optimally maximizing the hydrogen extraction. This may be controlled through one or more on-off valves. Estimation of number of modules will help effective use adsorption capacity.

When the polishing stage 170 comprises a PSA, adsorption capacity and cycle time may be optimized using various controls. In case of multiple rotary valve PSAs in parallel, this control will decide how many of such PSAs will be in operation to treat the PSA feed. In some embodiments, the utilization of hydrogen has a lower purity requirement such that the second permeate stream is sufficiently pure and the polishing stage may be eliminated. Lower purity requirement uses for hydrogen may include refineries and power plants.

The adaptive control of the hydrogen extraction process may be designed such that the measurement of the hydrogen concentration in the natural gas stream is used to calculate the feed flow rate to the first membrane stage 120, the number of modules (or module groups) in the first membrane stage 120, the number of modules (or module groups) in the second membrane stage 160, the number of PSAs in the polishing stage 170, and the cycle time of the PSAs.

A person of skill in the art will appreciate that although the process shown in FIG. 1 utilizes a two-stage membrane in which a second membrane stage is placed on the permeate leaving a first membrane stage, any permutation of membrane stages may be used as determined by basic optimization. For example, more stages may be placed on successive permeate streams to increase hydrogen purity, or more stages may be placed on successive retentate streams to increase hydrogen recovery.

Aspects of this invention include, but are not limited to:

Aspect 1: A method comprising measuring the concentration of a light gas in a main flow stream; calculating a control parameter as a function of the concentration of the light gas in the main flow stream; dividing a portion of the main flow stream to produce a feed stream; separating the feed stream by selective permeation across a semi-permeable membrane to produce a permeate stream enriched in the light gas and a retentate depleted in the light gas; wherein a ratio of the flow rate of the feed stream to the flow rate of the main flow stream is increased or decreased according to the control parameter; wherein an area of the semi-permeable membrane is increased or decreased according to the control parameter.

Aspect 2: A method according to Aspect 1, further comprising separating the permeate stream in one or more adsorption units to produce a light gas product; wherein the number of adsorption units is increased or decreased according to the control parameter.

Aspect 3: A method according to Aspect 2, wherein a cycle time of the adsorption units is increased or decreased according to the control parameter.

Aspect 4: A method according to any of Aspects 1 to 3, further comprising storing at least a portion of the permeate or a stream derived from the permeate.

Aspect 5: A method according to any of Aspects 1 to 4, wherein the semi-permeable membrane comprises a plurality of modules and wherein the area of the semi-permeable membrane is increased by connecting one or more of the plurality of modules to the feed flow and decreased by isolating one or more of the plurality of modules from the feed stream.

Aspect 6: A method according to any of Aspects 1 to 5, further comprising combining the retentate stream with the main flow stream.

Aspect 7: A method according to any of Aspects 2 to 6, wherein the control parameter is calculated to produce the light gas product at a constant flow rate when averaged over a time period ranging from 1 hour up to 7 days.

Aspect 8: A method according to any of Aspects 1 to 7, wherein the concentration of the light gas in the main flow stream varies with a frequency of less than 24 hours.

Aspect 9: A method comprising measuring the concentration of a light gas in a main flow stream; calculating a control parameter as a function of the concentration of the light gas in the main flow stream; dividing a portion of the main flow stream to produce a feed stream having a feed flow; separating the feed stream by selective permeation across a first semi-permeable membrane to produce a first permeate stream enriched in the light gas and a first retentate depleted in the light gas; wherein a ratio of the flow rate of the feed stream to the flow rate of the main flow stream is increased or decreased according to the control parameter; wherein an area of the first semi-permeable membrane is increased or decreased according to the control parameter; and wherein the first semi-permeable membrane comprises a plurality of modules and wherein the area of the first semi-permeable membrane is increased by connecting one or more of the plurality of modules to the feed flow and decreased by isolating one or more of the plurality of modules from the feed stream.

Aspect 10: A method according to Aspect 9, further comprising compressing the first permeate stream to produce a compressed permeate stream.

Aspect 11: A method according to Aspect 10, further comprising separating the compressed permeate stream by selective permeation across a second semi-permeable membrane to produce a second permeate stream enriched in the light gas and a second retentate depleted in the light gas and combining the second retentate with the feed stream.

Aspect 12: A method according to Aspect 11, further combining separating the second permeate stream in a number of adsorption units to produce a light gas product and a tail gas stream depleted in the light gas; and combining the tail gas stream with the first permeate stream.

Aspect 13: A method according to Aspect 11 or Aspect 12, wherein an area of the second semi-permeable membrane is increased or decreased according to the control parameter.

Aspect 14: A method according to Aspect 12 or Aspect 13, wherein the number of adsorption units is increased or decreased according to the control parameter.

Aspect 15: A method according to any of Aspects 9 to 14, wherein the control parameter is calculated to produce the light gas product at a constant flow rate when averaged over a time period ranging from 1 hour up to 7 days.

Aspect 16: A method according to any of Aspects 9 to 15, wherein the concentration of the light gas in the main flow stream varies with a frequency of less than 24 hours.

Aspect 17: A system comprising an analyzer in fluid flow communication with a main flow stream configured to measure a concentration of a light gas; a control valve in fluid flow communication with the main flow stream to produce a feed stream; a semi-permeable membrane in fluid flow communication with the feed stream configured to produce a permeate stream enriched in the light gas and a retentate depleted in the light gas; a controller in electrical communication with the analyzer and the semi-permeable membrane configured to increase or decrease an area of the semi-permeable membrane as a function of a calculated control parameter.

Aspect 18: A system according to Aspect 17, wherein the controller is configured to receive a signal from the analyzer and calculate the control parameter as a function of the concentration of the light gas in the main flow stream.

Aspect 19: A system according to Aspect 17 or Aspect 18, further comprising one or more adsorption units in fluid flow communication with the semi-permeable membrane configured to separate the permeate stream and produce a light gas product and a tail gas stream.

Aspect 20: A system according to Aspect 19, wherein the controller is configured to increase or decrease the number of adsorption units according to the control parameter.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The adjective "any" means one, some, or all, indiscriminately of quantity.

The phrase "at least a portion" means "a portion or all." The "at least a portion of a stream" has the same composition, with the same concentration of each of the species, as the stream from which it is derived.

As used herein, "first," "second," "third," etc. are used to distinguish among a plurality of steps and/or features, and is not indicative of the total number, or relative position in time and/or space, unless expressly stated as such.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

It should be understood that, although individual examples may be discussed herein, the present disclosure covers all combinations of the disclosed examples, including, without limitation, the different component combinations, method step combinations, and properties of the system.

EXAMPLE

Figure 2:
FIG. 2 is a graphical depiction showing an example variation in the concentration of hydrogen in natural gas as a function of time.
Figure 3:
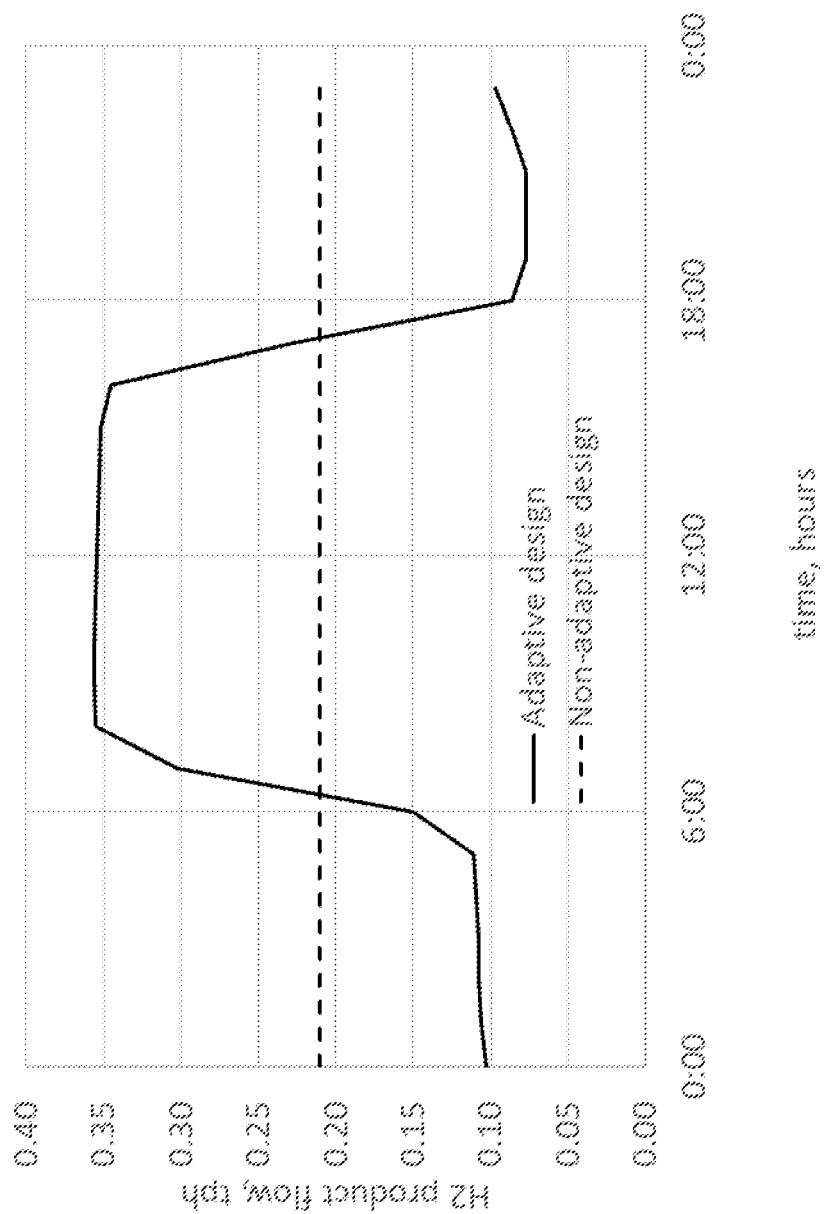
FIG. 3 is a graphical depiction showing the rate of hydrogen extraction as a function of time for a natural gas stream varying in concentration as shown in FIG. 2.
Figure 4:
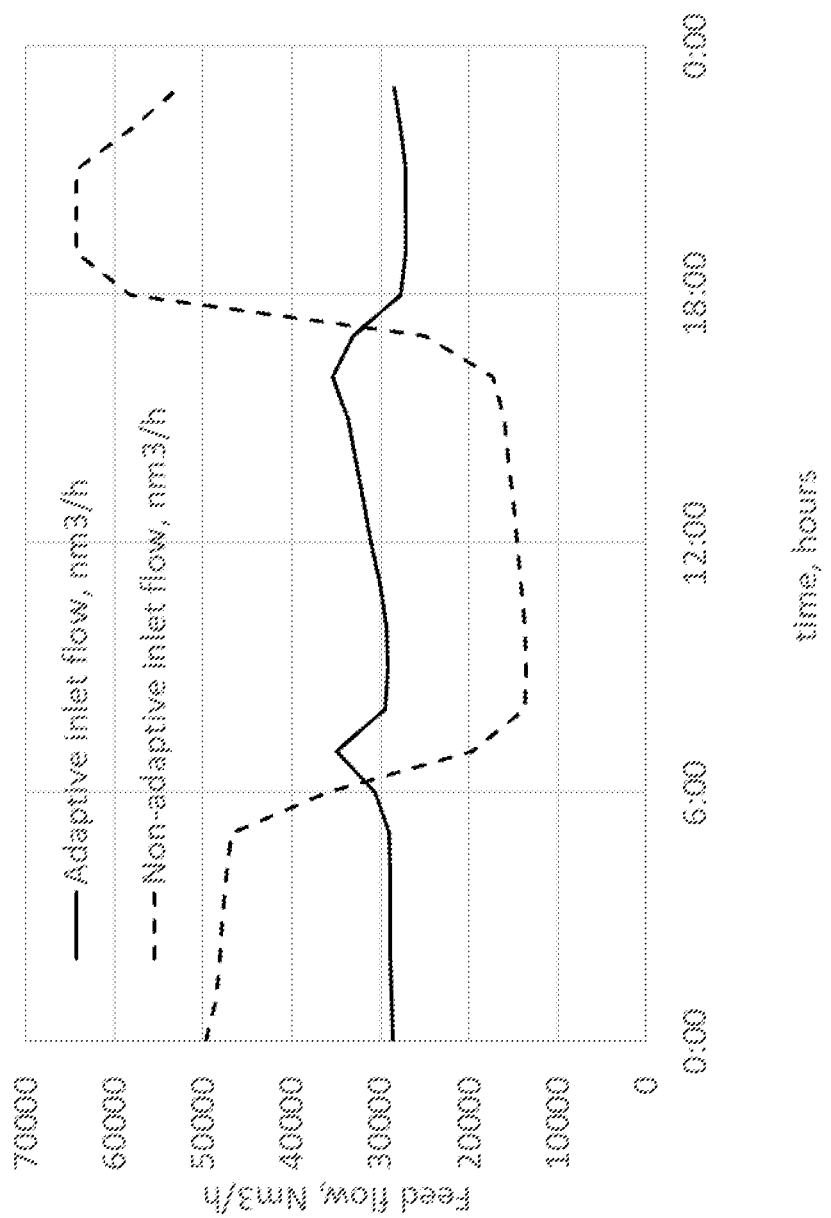
FIG. 4 is a graphical depiction showing the flow rate of the feed stream as a function of time for a natural gas stream varying in concentration as shown in FIG. 2.
Figure 5:
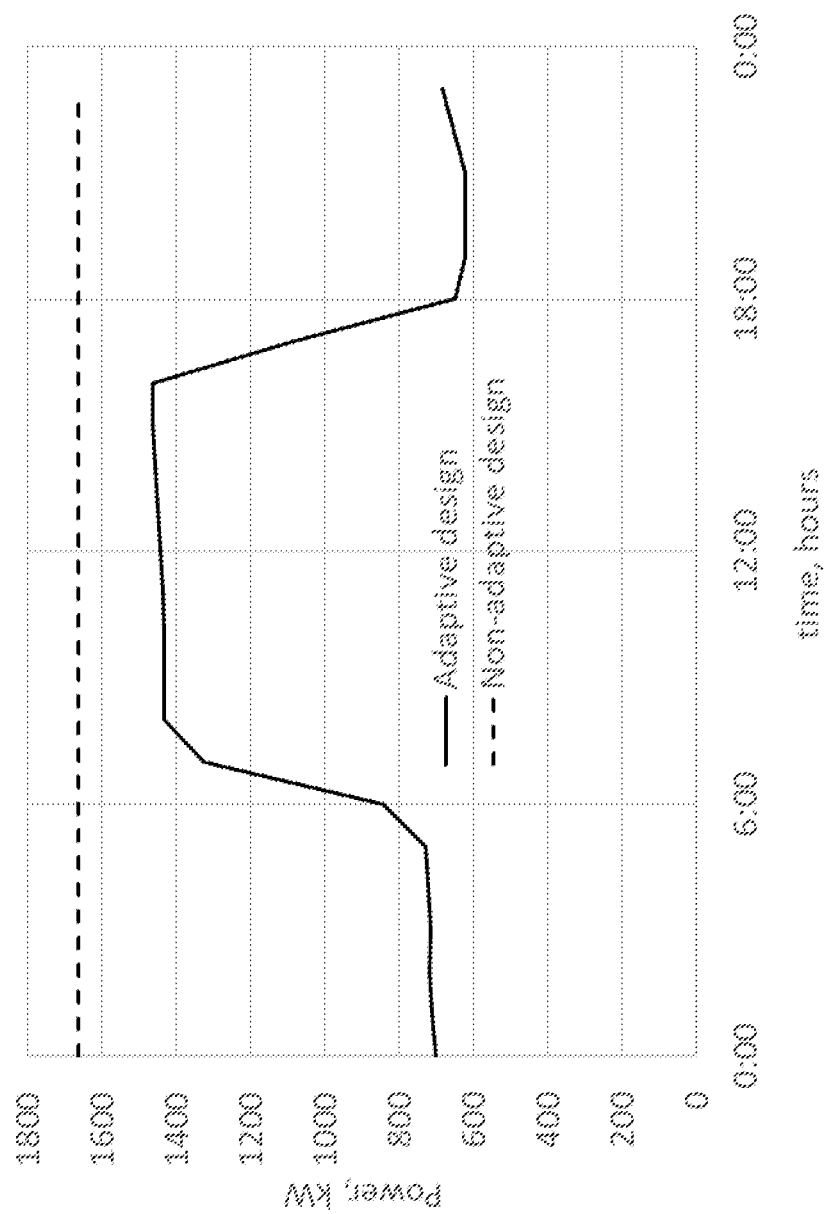
FIG. 5 is a graphical depiction showing the power consumed by the interstage compressor as a function of time for a natural gas stream varying in concentration as shown in FIG. 2.

An embodiment as shown in FIG. 1 was analyzed using the commercially available Aspen™ process modeling software to compare an adaptive design to a non-adaptive design. FIG. 2 is a graphical depiction of the concentration of hydrogen in the main flow stream 102 varying from 4% to 18% over the course of the day. All percentages are on a volume basis. FIG. 3 is a graphical depiction of the hydrogen product stream 172 flow rate for the adaptive design compared to a non-adaptive design. FIG. 4 is a graphical depiction of the feed stream 104 flow rate for the adaptive design compared to a non-adaptive design. FIG. 5 is a graphical depiction of the power consumed by interstage compressor 130 for the adaptive design compared to a non-adaptive design. Generally, the power consumption for the adaptive design may be lower than the non-adaptive design, demonstrating that changing the hydrogen production rate over time minimizes the amount of methane slipping through the membrane and requiring recompression. For the adaptive design, feed flow 104 may be controlled from 30-100% of the maximum flow rate, up to 22% of the membrane modules may be in isolation, the interstage compressor 130 may be turned down to as far as 40% capacity, the PSA may be turned down to as far as 35% capacity, and the PSA cycle time may be controlled to maintain a constant $H_2$ recovery.

Adaptive design may also be suitable for higher $H_2$ concentration in natural gas than the designed range, for cases in which the $H_2$ blend increases due to additional $H_2$ production and demand. Generally, the existing skid may be capable of extracting the same amount of hydrogen per day. It may even extract more if enough adsorption capacity is provided to purify more $H_2$. Generally, the number of membrane modules required for higher $H_2$ blend amounts may be lower than the number of modules required for lower $H_2$ blend. Therefore, with some modules isolated at higher $H_2$ concentration, the existing skid may extract the same hydrogen per day with the same calculated control parameters at different set points.

The overall cost for extracting $H_2$ using the adaptive design may be reduced by at least 30%, at least 20%, or at least 10% compared to the non-adaptive design. In some embodiments, the total flow rate of the first permeate stream 122 may be reduced using the adaptive design and thus the total power required to compress the first permeate stream 122 may be reduced. In at least some embodiments, the total number of membrane modules required to remove the same amount of hydrogen may be reduced in the adaptive design relative to the non-adaptive design.

While the principles of the invention have been described above in connection with preferred embodiments, it is to be clearly understood that this description is made only by way of example and not as a limitation of the scope of the invention.

What is claimed:

1. A method comprising:
   measuring the concentration of a light gas in a main flow stream;
   calculating a control parameter as a function of the concentration of the light gas in the main flow stream;
   dividing a portion of the main flow stream to produce a feed stream;
   separating the feed stream by selective permeation across a semi-permeable membrane to produce a permeate stream enriched in the light gas and a retentate depleted in the light gas;
   wherein a ratio of the flow rate of the feed stream to the flow rate of the main flow stream is increased or decreased according to the control parameter;
   wherein an area of the semi-permeable membrane is increased or decreased according to the control parameter.

2. The method of claim 1, further comprising separating the permeate stream in one or more adsorption units to produce a light gas product;
   wherein the number of adsorption units is increased or decreased according to the control parameter.

3. The method of claim 2, wherein a cycle time of the adsorption units is increased or decreased according to the control parameter.

4. The method of claim 1, further comprising storing at least a portion of the permeate stream or a stream derived from the permeate.

5. The method of claim 1, wherein the semi-permeable membrane comprises a plurality of modules and wherein the area of the semi-permeable membrane is increased by connecting one or more of the plurality of modules to the feed flow and decreased by isolating one or more of the plurality of modules from the feed stream.

6. The method of claim 1, further comprising combining the retentate stream with the main flow stream.

7. The method of claim 2, wherein the control parameter is calculated to produce the light gas product at a constant flow rate when averaged over a time period ranging from 1 hour to 7 days.

8. The method of claim 1, wherein the concentration of the light gas in the main flow stream varies with a frequency of less than 24 hours.

9. A method comprising:
   measuring the concentration of a light gas in a main flow stream;
   calculating a control parameter as a function of the concentration of the light gas in the main flow stream;
   dividing a portion of the main flow stream to produce a feed stream having a feed flow;
   separating the feed stream by selective permeation across a first semi-permeable membrane to produce a first permeate stream enriched in the light gas and a first retentate depleted in the light gas;
   wherein a ratio of the flow rate of the feed stream to the flow rate of the main flow stream is increased or decreased according to the control parameter;

wherein an area of the first semi-permeable membrane is increased or decreased according to the control parameter; and wherein the first semi-permeable membrane comprises a plurality of modules and wherein the area of the first semi-permeable membrane is increased by connecting one or more of the plurality of modules to the feed flow and decreased by isolating one or more of the plurality of modules from the feed stream.

10. The method of claim 9, further comprising compressing the first permeate stream to produce a compressed permeate stream.

11. The method of claim 10, further comprising separating the compressed permeate stream by selective permeation across a second semi-permeable membrane to produce a second permeate stream enriched in the light gas and a second retentate depleted in the light gas and combining the second retentate with the feed stream.

12. The method of claim 11, further comprising separating the second permeate stream in a number of adsorption units to produce a light gas product and a tail gas stream depleted in the light gas; and combining the tail gas stream with the first permeate stream.

13. The method of claim 11, wherein an area of the second semi-permeable membrane is increased or decreased according to the control parameter.

14. The method of claim 12, wherein the number of adsorption units is increased or decreased according to the control parameter.

15. The method of claim 9, wherein the control parameter is calculated to produce the light gas product at a constant flow rate when averaged over a time period ranging from 1 hour up to 7 days.

16. The method of claim 9, wherein the concentration of the light gas in the main flow stream varies with a frequency of less than 24 hours.

\* \* \* \* \*